United States Patent Office 3,646,023
Patented Feb. 29, 1972

3,646,023
DERIVATIVES OF 7-AMINOCEPHALOSPORANIC ACID
Hans Bickel, Binningen, Johannes Mueller and Rolf Bosshardt, Arlesheim, Heinrich Peter, Riehen, and Bruno Fechtig, Reinach, Basel-Land, Switzerland, assignors to Ciba-Geigy Corporation
No Drawing. Filed Dec. 2, 1969, Ser. No. 881,638
Claims priority, application Switzerland, Dec. 11, 1968, 18,498/68; Apr. 23, 1969, 6,149/69; June 24, 1969, 9,637/69
Int. Cl. C07d 99/24
U.S. Cl. 260—243 C 6 Claims

ABSTRACT OF THE DISCLOSURE

Derivatives of 7-(tetrazolyl-acetylamino)-cephalosporanic acid. Use: antibiotics.

---

The subject of this invention is the manufacture of new therapeutically active derivatives of 7-aminocephalosporanic acid (ACA) of the Formula I

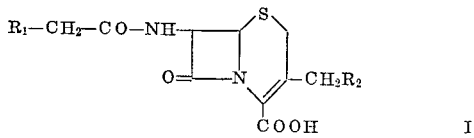

in which $R_1$ is a tetrazole radical bound through a nitrogen atom, and $R_2$ is a hydrogen atom or a free hydroxyl group or a hydroxyl group esterified by a carboxylic acid in which the ester-oxygen atoms may be replaced by sulfur atoms, with the exception of the acetoxy group, an optionally N-substituted carbamoyloxy group, in which the oxygen atoms may be replaced by sulfur, or a quaternary amino group, and optionally internal salts of the above compounds.

An esterified hydroxyl group $R_2$, in which the oxygen atoms may be replaced by sulfur, is derived from a carboxylic acid and is, for example, a lower-alkanoyloxy group which may be substituted, for example, by halogen atoms, especially chlorine, such as formyloxy, propionyloxy, butyryloxy, pivaloyloxy, chloracetoxy, or a monocyclic or dicyclic arylcarbonyloxy- or arylthiocarbonyloxy-, arylcarbonylmercapto, or arylthiocarbonyl-mercapto group, especially the benzoylmercapto group, which groups may be substituted, for example, by lower-alkyl, lower-alkoxy or lower-alkylmercapto radicals, halogen atoms or the nitro group.

$R_2$ may also be an optionally substituted carbamoyloxy group, for example a group of the formula

—O—CO—NH—$R_3$ in which $R_3$ is a hydrogen atom or an aliphatic, aromatic araliphatic or heterocyclic radical, especially a straight or branched lower-alkyl radical, which may be unsubstituted or substituted preferably by one or more lower-alkoxy groups or halogen atoms, such as the methyl, ethyl, but above all the β-chlorethyl radical.

$R_2$ may also be a thiocarbamoylmercapto group of the formula

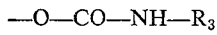

in which $R_3$ has a meaning given above, and $R_4$ is a hydrogen atom or $R_3$.

$R_2$ may also be a quaternary amino group in which the quaternary nitrogen atom, for example, is part of an aromatic ring, such as a quinoline, isoquinoline, or pyrimidine ring, but especially an unsubstituted or substituted pyridine ring, for example, of the formula

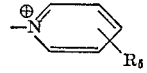

in which $R_5$ is hydrogen or one or more lower-alkyl loweralkoxycarbonyl, carbamoyl or carboxyl groups or one or more halogen atoms.

The salts of the new compounds are metal salts, above all those of therapeutically useful alkali metals or alkaline earth metals, such as sodium, potassium, ammonium, calcium or salts with organic bases, for example, triethylamine, N-ethyl-piperidine, dibenzylamine, N-benzyl-β-phenylethylamine, N,N'-dibenzylethylene diamine, ethanolamine, diisopropylamine, procaine and ephenamine. When $R_2$ is basic, internal salts may be formed.

The new compounds posses an especially good antibacterial action. They are active against gram-positive and especially against gram-negative bacteria, for example, against penicillin-resistant Staphylococcus aureus, Escherichia coli, Klebsiella pneumoniae, Salmonella typhosa, and Bacterium proteus, such as has been found also in animal tests, for example, on mice. In these tests with subcutaneous administration, depending on the nature of the bacterial infection, 0.1 to 100 mg./kg. are chemotherapeutically effective. The compounds are therefore useful for combating infections caused by such microorganisms, and also as additions to feeding materials, for conserving nutrients or as disinfecting agents. Especially valuable are compounds in which $R_2$ is the β chloroethylcarbamoyl group of an unsubstituted pyridinio group, or a pyridinio group substituted in the manner described above.

The compounds of the invention can be made by methods in themselves known. Thus they can be obtained, (a) by reacting a compound of the Formula II

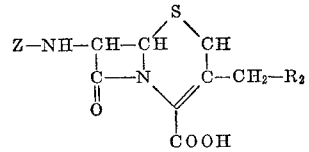

in which B is a halogen-acetyl radical, such as the fluorchloro-, iodo- or above all bromo-acetyl radical, and $R_2$ is hydrogen or a free or esterified hydroxyl group (in which the oxygen atoms of the ester group may be replaced by sulfur atoms), with tetrazole, or (b) acylating a compound of the Formula II in which Z is hydrogen, and $R_2$ is hydrogen or a free or esterified hydroxyl group (in which the oxygen atoms of the ester group may be replaced by sulfur atoms), so as to introduce the group $R_1$—$CH_2$—CO—, and converting a compound obtained according to (a) or (b), in which $R_2$ is the acetoxy group, into a compound having instead of the acetoxy group a hydrogen atom or a free hydroxyl group or an ester group other than the acetoxy group (in which the oxygen atoms may be replaced by sulfur atoms) or an optionally N-substituted carbamyloxy group, in which oxygen atoms may be replaced by sulfur atoms, or a quaternary amino group, and, if desired, the compound so obtained is converted into a therapeutically useful metal, such as alkali metal or alkaline earth metal salt, or a salt with ammonia or an organic base, or there is formed from a salt so obtained the free carboxylic acid or, if desired, an internal salt.

The reaction of the compound II, in which is a halogen-acetyl group, with tetrazole takes place at room temperature or at a slightly raised or lowered temperature, and preferably at 20°–40° C. It is preferably carried out in an inert organic solvent, such as methylene chloride, chloroform, carbon tetrachloride, tetrahydrofurane, dioxane, dimethylformamide or acetonitrile in the presence of an agent capable of binding hydrogen halide, for example, a weak inorganic base such as an alkali metal carbonate, bicarbonate or acetate or a tertiary amine, especially a tri-lower alkylamine, preferably di-isopropyl-ethylamine (Hünig base).

The acylation of a compound II, in which Z is hydrogen, is carried out in a manner known for the acylation of amino-acids, for example, by means of an acid halide, especially an acid chloride, or an acid azide or an acid anhydride, for example, a mixed anhydride formed with a mono-esterified carbonic acid, pivalic acid or trichloracetic acid, or with the free acid itself in the presence of a condensing agent such as a carbodiimide, for example, dicyclohexyl-carbodiimide. The acylation of the compound II may also be carried out by first silylating or stannylating a compound II, in which Z is hydrogen, then acylating the silylation or stannylation product with the acid or a reactive acid derivative, which contains the group $R_1$—$CH_2$—CO—, and, if desired, splitting off a silyl or stannyl group that may be present by means of alcohol or water, see, for example British Pat. No. 1,073,530 and Dutch application No. 6,717,107.

The cephalosporane derivatives used as starting material are known or can be obtained by methods in themselves known. The compounds of the Formula II, in which Z is hydrogen, and R is an ester group other than the acetoxy group, are advantageously obtained by the process described in U.S. application No. 739,628.

The conversion of a compound of the Formula I, in which $R_2$ is the acetoxy group, into a compound having a free hydroxyl group and its esterification with an acid other than acetic acid or its conversion into a carbamoyl derivative or compound, in which R is a quaternary amino group, is carried out in a manner in itself known.

The invention also includes any modification of the process in which there is used as starting material a compound obtainable as an intermediate product at any stage in the process, and the remaining steps are carried out, or in which the process is interrupted at any stage, or in which the starting material is formed under the conditions of a reaction, or in which the reaction components are present optionally in the form of their salts.

The new compounds are useful as medicaments, for example, in the form of pharmaceutical preparations. These preparations contain the compound in admixture with an organic or inorganic, solid or liquid carrier suitable for enteral, topical or parenteral administration. For making the carrier there are used substances that do not react with the new compounds, for example, water, gelatine, lactose, starches, stearyl alcohol, magnesium stearate, talc, vegetable oils, benzyl alcohols, gums, propylene glycol, polyalkylene glycols, white petroleum jelly, cholesterol or other known carriers for medicaments. The pharmaceutical preparations may be in the form, for example, of tablets, dragees, salves, creams, capsules or in liquid form as solutions, suspensions or emulsions. If desired, they may be sterilized and/or they may contain auxiliary substances, such as preserving, stabilizing, wetting or emulsifying agents, solution promoters or salts for regulating the osmotic pressure or buffers. They may also contain other therapeutically valuable substances. The preparations are made by the usual methods.

The following examples illustrate the invention.

In the thin layer chromatography on silica-gel plates referred to in the examples the following systems were used:

System 52=n-butanol-glacial acetic acid-water (75:7.5:21)

System 101A=n-butanol-pyridine-glacial acetic acid-water (42:24:4:30).

In the examples, "MIC" means the minimum inhibitory concentration which is measured by the gradient plate test described in "Antibiotics" vol. I by Gottlieb and Shaw, New York 1967, page 508. The MIC is determined on strains of Staphylococcus aureus SG 511 (sensitive to penicillin) or Staphylococcus aureus 2999 (resistant to penicillin), Bacillus subtilis, Bacillus megatherium, Escherichia coli 2018, Klebsiella pneumoniae and/or Salmonella typhimuri.

EXAMPLE 1

3.93 grams of 7-bromoacetyl-aminocephalosporanic acid are dissolved in 25 ml. of methylene chloride with the addition of 3.45 ml. of N,N-di-isopropyl-ethylamine. There is added a solution prepared by dissolving 0.84 gram of tetrazole in 5 ml. of dimethylformamide and then diluting with 10 ml. of methylene chloride. The solution is rinsed out with 7 ml. of methylene chloride.

After 30 hours 40 ml. of a solution of potassium dihydrogen phosphate of 10% strength is added to the reaction mixture, and the pH-value of the aqueous phase is adjusted to 5.2 by the addition of a 2 N-solution of sodium carbonate. The mixture is agitated and then the two phases are separated The aqueous phase is extracted once again with 100 ml. of ethyl acetate, and the two organic solutions are discarded, after they have been washed twice on each occasion with 20 ml. of a $\frac{1}{15}$ molar phosphate buffer having a pH-value of 5.

The combined aqueous phases are covered with 500 ml. of ethyl acetate, adjusted to a pH-value of 2.6 by agitation with N-hydrochloric acid, and saturated with sodium chloride. After separating the organic phase the aqueous solution is further extracted with 200, 100 and 100 ml. of ethyl acetate. The ethyl acetate solutions are in succession washed with 40 ml. of saturated sodium chloride solution, dried with sodium sulfate, and evaporated to dryness in vacuo. There are obtained first 3.5 grams of a yellowish resin. The latter is dissolved in 15 ml. of methanol, 4.0 ml. of a 3-molar methanolic solution of sodium α-ethyl-hexanoate are added, and then ether is added slowly. After allowing the mixture to stand for half an our at 0° C., 3.6 grams of the crystalline sodium salt of 7-[tetrazolyl(1) - acetylamino] - cephalosporanic acid are isolated by filtration. The crystalline acid is obtained by re-extraction in ethyl acetate at a pH-value of 2.

$Rf_{52}=0.17$; $Rf_{101A}=0.47$, $[\alpha]_D^{20}=+157°$ C.±1° C. c.=1, in water as the sodium salt).

Ultra-violet spectrum in water as the sodium salt: $\lambda_{max}=260$ m$\mu$ ($\epsilon=7900$).

NMR-spectrum in deutero-dimethylsulphoxide (100 mc.): Apart from the characteristic signals for 7-ACA there is a singlet at $\delta=5.35$ p.p.m., which can be associated with the —$CH_2$ group of the tetrazolyl-acetyl residue, and a singlet at $\delta=9.35$ p.p.m. for the =CH-group in the tetrazole ring. No exchange with $D_2O$ in the tetrazolyl residue.

8.8 grams of 7-[tetrazolyl (1)-acetylamino]-cephalosporanic acid and 5.0 grams of potassium thiocyanate are suspended, under nitrogen, in 35 ml. of water and the suspension, while being vigorously stirred, heated to 60° whereby a clear solution is obtained. Then 5.0 ml. of pyridine are added and the whole stirred at 60° C. for 6½ hours. The reaction mixture is then cooled down to room temperature and extracted first with 300 ml. and then with 200 ml. of methyl-isobutyl ketone and then six times, each time with 120 ml. of a solution of "Amberlite" LA–1 acetate in methyl-isobutyl ketone obtained by stirring 200 ml. of "Amberlite" LA–1, 24 ml. of glacial acetic acid and 600 ml. of methyl-isobutyl ketone with 160 ml. of water for half an hour and separating the organic phase. Finally, the above reaction mixture is extracted with 2× 120 ml. of methyl-isobutyl ketone. The remaining aqueous solution is concentrated under a pressure of about 0.5 mm. Hg to half its volume, then 70 ml. of dimethylformamide added and the mixture concentrated in the same vacuum to about 20 ml. A precipitate is obtained which is separated and dried in a high vacuum. The substance may be crystallized by dissolving it in a small quantity of water and leaving it at 0° C. The 3-(desacetoxymethyl) - 3 - pyridiniomethyl - 7 - [tetrazolyl-(1)-acetylamino]-cephalosporanic acid has an optical rotation $[\alpha]_D^{20} = +40° \pm 1°$ (c.=0.92 in water). In the U.V. spectrum $\delta_{max} = 256$ nm ($\epsilon = 13,700$). $Rf_{52} = 0.01$; $Rf_{101A} = 0.11$. Mice infected with a lethal dosis of *Staphylococcus aureus* survive if they are given 0.3 mg./kg. of the substance once subcutaneously. The $LD_{50}$ (dosis which kills 50% of the animals) for mice, on 1 subcutaneous administration of the substance, is more than 1000 mg./kg. Under the same conditions the dosis of 7-[tetrazolyl(1)-acetylamino]-cephalosporanic acid which is necessary to protect mice from being killed by infection with St. aureus is 3 mg./kg.; $LD_{50}$ more than 100 mg./kg.

EXAMPLE 2

14.1 grams of 3-(desacetoxymethyl) - 3 - benzoyl-thiomethyl-7-bromacetylamino-cephalosporanic acid are dissolved in 60 ml. of dimethylformamide with the addition of 10.5 ml. of N,N-diisopropyl-ethylamine. There is then added a solution of 2.52 grams of tetrazole in 10 ml. of dimethylformamide. The mixture is rinsed out with 5 ml. of dimethylformamide.

After allowing the whole to stand for 46 hours at room temperature, 95 ml. of N/12-hydrochloric acid are introduced into the reaction mixture now cooled with ice while stirring vigorously. The resulting brown floccular precipitate is then filtered through a thin "Hyflo" layer, and is discarded. In the manner described above a further 505 ml. of N/12-hydrochloric acid are added to the filtrate and the almost colorless precipitate is separated by filtration and washing with 20 ml. of water. This crude product is purified by chromatography on a column of 340 grams of silica-gel (diameter 5 cm.) with mixtures of chloroform and acetone. The eluates obtained with mixtures of chloroform and acetone in the ratios by volume from 3:1 to 1:1 are evaporated to dryness in vacuo, again dissolved in methanol, and converted by means of sodium α-ethyl hexanoate into the pure sodium salt of 3-(desacetoxymethyl) - 3 - benzoyl - thiomethyl - 7 - [tetrazolyl-(1)-acetylamino]-cephalosporanic acid.

Ultra-violet spectrum in water: $\lambda_{max} = 243$ m$\mu$ ($\epsilon = 15800$) and 275 m$\mu$ ($\epsilon = 20100$).
$Rf_{52} = 0.36$; $Rf_{101A} = 0.48$.

The starting material can be prepared in the following manner: a solution of 17.5 grams of 3-(desacetoxymethyl)-3-benzoylthiomethyl)-7-amino-cephalosporanic acid (see Belgian Pat. No. 650444) and 12.5 ml. of triethylamine in 1 liter of dimethylformamide is introduced dropwise in the course of one hour into a well stirred solution, maintained at −13° to −15° C., of 9.2 ml. of bromacetyl bromide in 100 ml. of methylene chloride (in an atmosphere of nitrogen). The temperature is allowed to rise slowly to 10° C. in the course of 1½ hours, and this temperature is maintained for a further half hour. The greater part of the solvent is then distilled off under a pressure of 0.5 to 1 mm. of mercury with the use of a condenser cooled with a mixture of Dry Ice and acetone. The oily product is poured onto a phosphate buffer having a pH-value of 6, and is agitated with 1 liter of ethyl acetate. A precipitate is formed at the boundary between the two phases, and the precipitate is separated by filtration or by centrifuging. The aqueous phase is then adjusted to a pH-value of 2, and is then saturated with sodium chloride and the organic phase is separated. The aqueous phase is re-extracted with 600 and 400 ml. of ethyl acetate. After being washed with a saturated solution of sodium chloride, the organic phases are dried over sodium sulfate, and filtered in succession through a column of 100 mg. of silica-gel. The filtrates are evaporated to dryness in vacuo, 30 ml. of ethanol are added to the residue, and it is crystallized out at −20° C. There are obtained 7.8 grams of 3-(desacetoxymethyl)-3-benzoylthiomethyl - 7 - bromacetylamino-cephalosporanic acid melting at 137–138° C.

$Rf_{52} = 0.55$. The sodium salt exhibits in the ultra-violet spectrum in water:

$\lambda_{max} = 243$ m$\mu$ ($\epsilon = 16,800$), and 275 m$\mu$ ($\epsilon = 20,600$).
$[\alpha]_D^{20} = -47 \pm 1°$ (c.=1; in 0.1 mol of sodium bicarbonate and acetone (1:1).

EXAMPLE 3

4.32 grams of the sodium salt of 3-(desacetoxymethyl)-3-benzoylthiomethyl - 7 - [tetrazolyl-(1)-acetylamino]-cephalosporanic acid are dissolved in 35 ml. of pyridine, and then 35 ml. of dioxane are added. There are then added 20.9 ml. of a solution of mercury perchlorate of 40% strength, and the reaction is allowed to proceed at 45° C. while stirring vigorously for 45 minutes (in an atmosphere of nitrogen). The whole is cooled, 11.1 ml. of thiobenzoic acid are added, and the mixture is agitated for 5 minutes. The solvent is distilled off in vacuo, and a solution of the residue in 140 ml. of water is filtered through "Celite." The filtrate is washed in succession with 90 ml. of toluene, twice with 55 ml. of "Amberlite" LA–2 in 115 ml. of toluene on each occasion, and twice with 90 ml. of toluene on each occasion. The aqueous phase is then filtered through a column which contains from the bottom to the top 8.5 ml. of "Sephadex" CM–25 (H+-form), 34 ml. of "Alox," 8.5 ml. of "Zeo-Karb" 226 (H+-form), 34 ml. of "Alox," 8.5 ml. of "Dowex–1" (the acetate form), and 8.5 ml. of "Sephadex" C–25 (H+-form). The "Celite," organic phases and the column are re-extracted twice with 30 ml. of water on each occasion, and the column is eluated with a further 200 ml. of water. The combined eluates are evaporated in vacuo, a small amount of precipitate is removed by filtration, and the whole is evaporated to dryness.

The residue is digested in 10 ml. of alcohol, and pure 3-(desacetoxymethyl)-3-pyridino-methyl - 7 - [tetrazolyl-(1)-acetylamino]-cephalosporanic acid is obtained.

$[\alpha]_D^{20} = +40° +1°$ (c.=0.92 in water).
Ultra-violet spectrum: $\lambda_{max}$, $\epsilon = 256$m$\mu$, $\epsilon = 13,700$.
$Rf_{52} = 0.01$; $Rf_{101A} = 0.11$.

EXAMPLE 4

10.2 grams of the sodium salt of 7-[tetrazolyl-(1)-acetylamino]-cephalosporanic acid are dissolved in 300 ml. of water, and the solution is heated to 37° C. and adjusted to a pH-value of 7.5 by means of an 0.2 N-solution of sodium hydroxide. There is then added a suspension of 240 mg. of acetyl-esterase (obtained from *Bacillus subtilis* ATCC 6633, see Belgian Pat. No. 1,080,904) in about 5 ml. of water, and the acetic acid formed is continuously neutralised with an 0.2 N solution of sodium hydroxide (adjusting to a pH-value of 7.5; temperature 37° C.). After 5½ hours, the reaction is complete. The pH-value is adjusted to 6.5, and the solution is filtered through a glass frit G4 and lyophilized. There are obtained 11.49 grams of a yellowish resin consisting of the sodium salt of 7-[tetrazolyl-(1)-acetylamino] - O - desacetyl-cephalosporanic acid.

9.61 grams of this crude product are suspended in 100 ml. of absolute dimethylformamide, and then 0.15 ml. of $(Bu_3Sn)_2O$ (tributyl tin oxide) is added. A solution of 10.6 ml. of β-chloroethyl-isocyanate in 45 ml. of dimethylformamide is then added dropwise in the course of 15 minutes, and the whole is stirred for a further hour. The reaction mixture is filtered, and the filtrate is evaporated to dryness in a high vacuum. The resinous residue is triturated three times with 500 ml. of absolute ether on each occasion (the ether-soluble portion=4.03 grams of oil is discarded), and is then taken up in 250 ml. of a phosphate buffer of 10% strength having a pH-value of 6.7. The mixture is extracted in succession with 1.5 liters and 0.5 liter of ethyl acetate. The organic phases are re-extracted twice with 100 ml. of buffer having a pH-value of 6.7 on each occasion, and are then discarded. The aqueous phases are combined, then covered with 1.5 liters of ethyl acetate, adjusted to a pH value of 2.4 by the addition of 2 N-hydrochloric acid, while agitating, and the phases are separated. After being saturated with sodium chloride, the aqueous phase is extracted twice with 1 liter of ethyl acetate on each occasion, the organic phases are washed in succession twice with 200 ml. of a saturated solution of sodium chloride on each occasion, then dried with sodium sulphate, and evaporated to dryness in vacuo. There are obtained 6.32 grams of an amorphous residue, from which the sodium salt (crude product) can be obtained by means of sodium α-ethyl hexanoate. The sodium salt can be converted into the crystalline acid form by acidification and extraction with ethyl acetate. From the acid form there can be obtained in the manner described above the pure crystalline sodium salt of O-desacetyl-O-(β-chloroethylcarbamoyl) - 7 - [tetrazolyl - (1) - acetyl-amino]-cephalosporanic acid.

Ultra-violet spectrum $\lambda_{max}=260$ m$\mu$, ($\epsilon=9200$).
Optical rotation $[\alpha]_D^{20}=+121°\pm1°$ (c.=1 in water).
Thin layer chromatogram on silica-gel: $Rf_{101A}=0.5$; $Rf_{52}=0.23$. MIC: *St. aureus* SG 511=0.35 γ/ml.; *Bac subt.*=0.2 γ/ml.; *Bac. megath.*=45 γ/ml.; *E. coli* 2018 =1.5 γ/ml.; *Kl. pneum.*=0.3 γ/ml.; *Salm. typh.*=2 γ/ml.

EXAMPLE 5

9.15 grams of the sodium salt of 7-[tetrazolyl-(1)-acetylamino]-cephalosporanic acid are dissolved in 270 ml. of water, and converted at 37° C. by means of 240 mg. of acetylesterase into the sodium salt of 1-[tetrazolyl-(1)-acetylamino] - O - desacetyl-cephalosporanic acid (10.3 grams) in the manner described in Example 4.

This crude product is suspended in 100 ml. of absolute dimethyl formamide, and 0.16 ml. of tri-n-butyl tin oxide [(Bu₃Sn)₂O] is added. There is then added dropwise in the course of 5 minutes, while cooling, a solution of 8.1 grams (10.8 ml.) of methyl isocyanate in 45 ml. of dimethylformamide, and the whole is stirred for a further hour. The reaction mixture is filtered, and the filtrate is evaporated to dryness in a high vacuum. The resinous residue is triturated three times with 500 ml. of absolute ether on each occasion (the ether-soluble portion being separated and discarded), and then taken up in 250 ml. of phosphate buffer of 10% strength having a pH-value of 6.7. The mixture is then extracted in succession with 1.5 liters and 0.5 liter of ethyl acetate. The organic phases are re-extracted twice with 100 ml. of a buffer having a pH-value of 6.7 on each occasion, and are then discarded. The aqueous phases are combined, then covered with 1.5 liter of ethyl acetate, adjusted to a pH-value of 2.4 by the addition of 5 N-hydrochloric acid with agitation, and the phases are separated. After being saturated with sodium chloride, the aqueous phase is again extracted three times with 1 liter of ethyl acetate on each occasion. The organic phases are successively washed twice with 200 ml. of a saturated solution of sodium chloride on each occasion, dried with sodium sulfate, and filtered through a column (diameter 4.5 cm.) of 100 grams of silica-gel. The column is washed with 500 ml. of ethyl acetate, and the combined ethyl acetate eluates are evaporated to dryness in vacuo. There are obtained 4.7 grams of an amorphous residue. The residue is taken up in 20 ml. of acetone, in which the greater part dissolves. By the addition of 80 ml. of chloroform there is obtained a pale brown precipitate, which is separated by filtration and then again subjected to the same treatment with acetone and chloroform. The precipitate (1.2 grams) so obtained is taken up in 40 ml. of methanol, and is brought into solution by the addition of 1.7 ml. of methanolic sodium α-ethyl hexanoate (3 m.). By means of a spatula tip of "Norit" (active carbon) and then filtration through "Celite" it is de-colorized, and then the solution is concentrated to a volume of about 10 ml. In this manner there is obtained the crystalline sodium salt, which is filtered off and washed with acetone. The filtrates obtained in the above described treatment with acetone and chloroform are transferred successively to a column of 100 grams of silica-gel (diameter 3 cm., height 27.5 cm.). Chromatography is carried out by slowly increasing the content of acetone in the eluting agent. At a ratio by volume of acetone to chloroform of 1:3 the desired substance is eluted. It is converted into the crystalline sodium salt in the manner described above.

The combined sodium salt fractions (about 90% purity) are converted into the acid form for further purification. For this purpose the combined fractions are dissolved in 30 ml. of water, covered with 300 ml. of ethyl acetate, adjusted to a pH-value of 2.4 by means of dilute hydrochloric acid, and saturated with sodium chloride. After separating the phases, the aqueous phase is extracted in succession with 200 and 100 ml. of ethyl acetate. The combined organic phases are washed with a saturated solution of sodium chloride, dried with sodium sulfate, filtered through a column of 10 grams of silica-gel, and evaporated to dryness in vacuo. The residue is converted by means of a 3-molar methanolic solution of sodium α-ethyl hexanoate directly into the pure crystalline sodium salt of O-desacetyl-O-methylcarbamoyl-7-[tetrazolyl-(1) - acetylamino]-cephalosporanic acid.

Ultra-violet spectrum: $\lambda_{max}=262$ m$\mu$ ($\epsilon=8450$).
Optical rotation: $[\alpha]_D^{20}=+127°\pm1°$ (c.=0.98 in water).
Thin layer chromatogram on silica-gel: $Rf_{52}=0.17$, $Rf_{101A}=0.40$.
MIC: *St. aureus* SG 511=0.4 γ/ml.; *Bac subt.*=0.2 λ/ml.; *Bac. megath.*=45 λ/ml.; *E. coli* 2018—20 λ/ml.; *Kl. pneum.*=2.5 λ/ml.; *Salm. typh.*=3 λ/ml.

EXAMPLE 6

9.15 grams of the sodium salt of 7-[tetrazolyl-(1)-acetylamino]-cephalosporanic acid are dissolved in 270 ml. of water, and converted at 37° C. by means of 240 mg. of acetylesterase in the manner described in Example 4 into the sodium salt of 7-[tetrazolyl-(1)-acetylamino]-O-desacetyl-cephalosporanic acid (10.3 grams).

This crude product is suspended in 100 ml. of absolute dimethyl-formamide and 0.16 ml. of tri-n-butyl tin oxide [Bu₃Sn)₂O] is added. There is then introduced dropwise in the course of 5 minutes, while cooling, a solution of 11.2 ml. of ethyl isocyanate in 45 ml. of dimethyl-formamide, and stirring is continued for a further hour. The reaction mixture is filtered, and the filtrate is evaporated to dryness in a high vacuum. The resinous residue is triturated three times with 500 ml. of absolute ether on each carded), and is then taken up in 250 ml. of phosphate buffer of 10% strength having a pH-value of 6.7. The mixture is then extracted in succession with 1.5 liters and 0.5 liter of ethyl acetate. The organic phases are re-extracted twice with 100 ml. of buffer having a pH-value of 6.7 on each occasion, and then discarded. The aqueous phases are combined, then covered with 1.5 liters of ethyl acetate, adjusted to a pH-value of 2.4 by the addition of 5 N-hydrochloric acid and agitation, and the phases are separated. After being saturated with sodium chloride, the aqueous phase is extracted three times with 1 liter of ethyl acetate on each occasion. The organic phases are successively washed twice with 200 ml. of saturated sodium chloride solution on each occasion, dried with sodium sulfate, and filtered through a column (diameter 4.5 cm.) of 100 grams of silica-gel. The column is washed with 500 ml. of fresh ethyl acetate, and the combined ethyl acetate eluates are evaporated to dryness in vacuo. There are obtained 5.49 grams of an amorphous residue. The latter is taken up in 20 ml. of acetone, in which it partially dissolves. By the addition of 80 ml. of chloroform there is obtained a pale brown precipitate, which is separated by filtration, and then subjected to the above described treatment with acetone and chloroform. The precipitate (2.8 grams) obtained therefrom is taken up in 80 ml. of methanol, and by the addition of 3.6 ml. of methanolic sodium α-ethyl hexanoate (3 molar) is brought into solution. By means of a spatula tip of Norit (active carbon)

followed by filtration through Celite the solution is decolorized, and it is then concentrated to a volume of about 5 ml. In this manner there is obtained the crystalline sodium salt, which is filtered off and washed with chloroform. The filtrates obtained by the above described treatment with acetone and chloroform are transferred successively to a column of 100 grams of silica-gel (diameter 3 cm., height 27.5 cm.). Chromatography is carried out by slowly increasing the acetone content of the eluting agent. At a ratio by volume of acetone to chloroform of 1:3 the desired substance is eluted. It is converted into the crystalline sodium salt in the manner described above.

For the purpose of further purification the combined sodium salt fractions (about 90% purity) are converted into the acid form. The product is dissolved in 35 ml. of water, then covered with 350 ml. of ethyl acetate, adjusted to a pH-value of 2.4 by means of dilute hydrochloric acid, and saturated with sodium chloride. After separating the phases, the aqueous phase is extracted with 250 and 150 ml. of ethyl acetate. The combined organic phases are washed with saturated sodium chloride solution, dried with sodium sulfate, filtered through a column of 15 grams of silica-gel, and evaporated to dryness in vacuo. By means of a 3-molar methanolic solution of sodium α-ethyl hexanoate the residue is converted directly into the pure crystalline sodium salt of O-desacetyl-O-ethyl-carbamoyl-7 - [tetrazolyl - (1)-acetylamino]-cephalosporanic acid.

Ultra-violet spectrum $\lambda_{max}$, $\epsilon=261$ m$\mu$ ($\epsilon=8550$).
Optical rotation $[\alpha]_D^{20}=+124°\pm1°$ (c.=0.98 in water)
Thin layer chromatogram on silica-gel: $Rf_{52}=0.21$; $Rf_{101}A=0.44$.
MIC: *St. aureus* SG 511=0.4 γ/ml.; *Bac subt.*=0.2 γ/ml.; *E. coli* 2018=5 γ/ml.; *Kl. pneum.*=2 γ/ml.; *Salm. typh.*=2 γ/ml.

We claim:
1. A compound of the Formula I

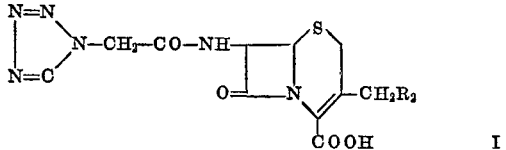

in which $R_2$ is a monocyclic and dicyclic carbocyclic arylcarbonylmercapto group which is unsubstituted or substituted by a member selected from the group consisting of lower alkyl, lower alkoxy, lower alkylmercapto, halogen and nitro, or an N-substituted carbamoyloxy group, the substituents being selected from the group consisting of lower alkyl and halogen-substituted lower alkyl or a therapeutically useful salt of such compound.

2. A compound of the Formula I as claimed in claim 1, wherein $R_1$ has the meaning there indicated, and $R_2$ stands for the lower benzoxylthio group or a therapeutically useful salt thereof.

3. A compound of the Formula I as claimed in claim 1, wherein $R_1$ has the meaning there indicated, and $R_2$ stands for a lower alkylcarbamoyloxy group or a therapeutically useful salt thereof.

4. A compound of the Formula I as claimed in claim 1, wherein $R_1$ has the meaning there indicated and $R_2$ represents a carbamoyloxy group of the formula $$-O-CO-NH-R_3$$

wherein $R_3$ represents a lower alkyl residue substituted by one or more than one lower alkoxy groups or halogen atoms, or a therapeutically useful salt thereof.

5. A compound of the Formula I as claimed in claim 1, wherein $R_1$ has the meaning there indicated, and $R_2$ stands for a carbamoyloxy group of the formula $$-O-CO-NH-R_3$$

in which $R_3$ stands for a lower alkyl residue substituted by one or more than one chlorine atom, or a therapeutically useful salt thereof.

6. A compound of the Formula I as claimed in claim 1, wherein $R_1$ has the meaning there indicated, and $R_2$ represents the β-chlorethylcarbamoyloxy group, or a therapeutically useful salt thereof.

References Cited

UNITED STATES PATENTS 3,468,874    9/1969    Raap et al. _____ 260—243 C

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,646,023      Dated February 29, 1972

Inventor(s) Hans Bickel et al

It is certified that error appears in the above-identified patent and that said Letters Patent are hereby corrected as shown below:

Column 10, lines 8, 12, 16, 25 and 34, in each delete "$R_1$ has the meaning there indicated, and".

Signed and sealed this 21st day of November 1972.

(SEAL)
Attest:

EDWARD M. FLETCHER, JR.                ROBERT GOTTSCHALK
Attesting Officer                      Commissioner of Patents